March 11, 1958 S. A. STONE ET AL 2,826,304
MATERIAL SEPARATING DEVICE
Filed Dec. 26, 1952 4 Sheets-Sheet 1
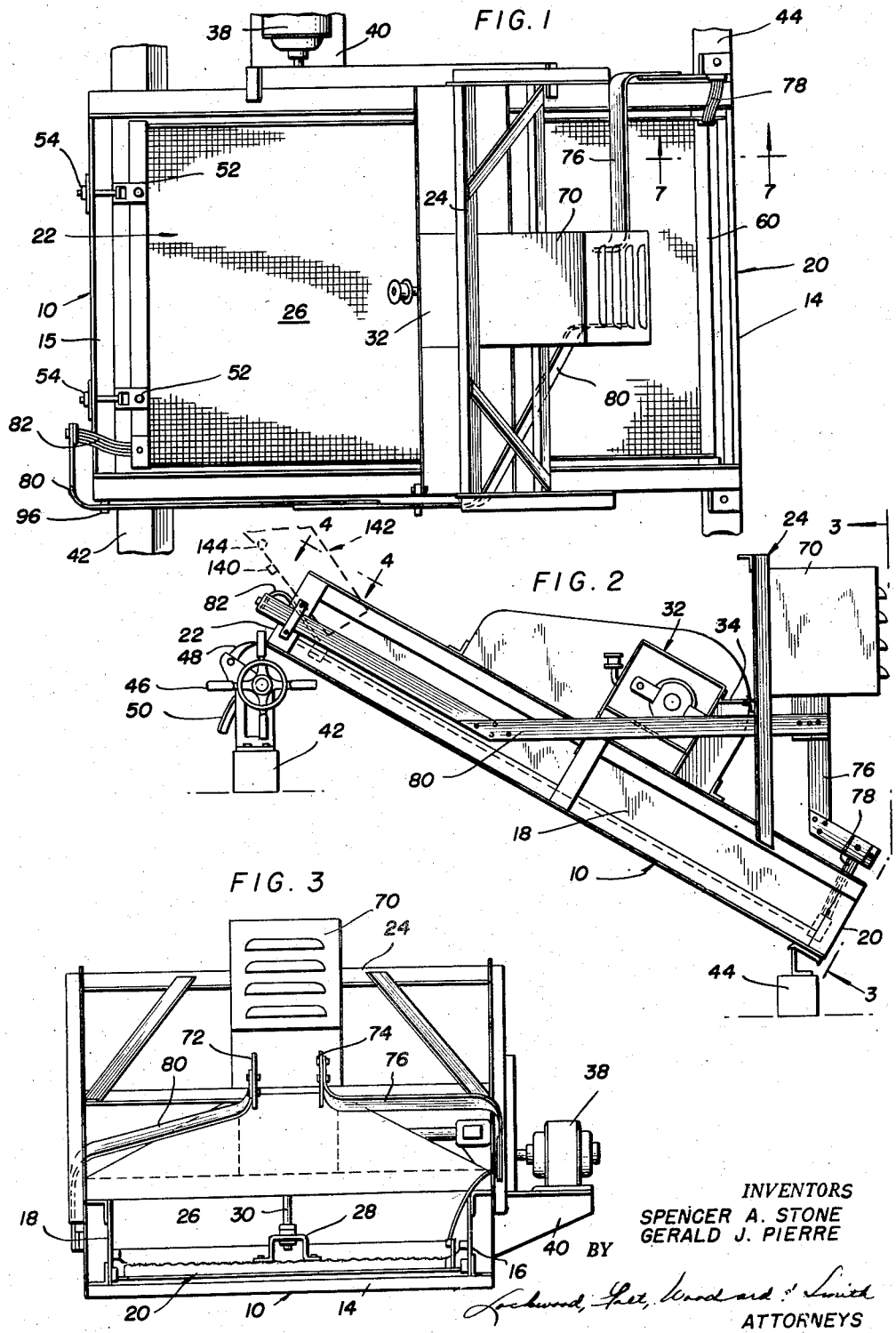
INVENTORS
SPENCER A. STONE
GERALD J. PIERRE
BY
ATTORNEYS

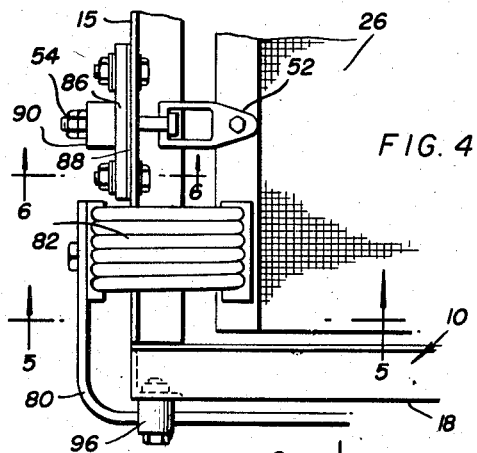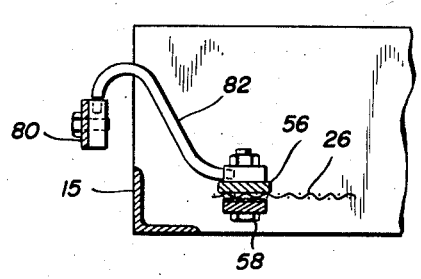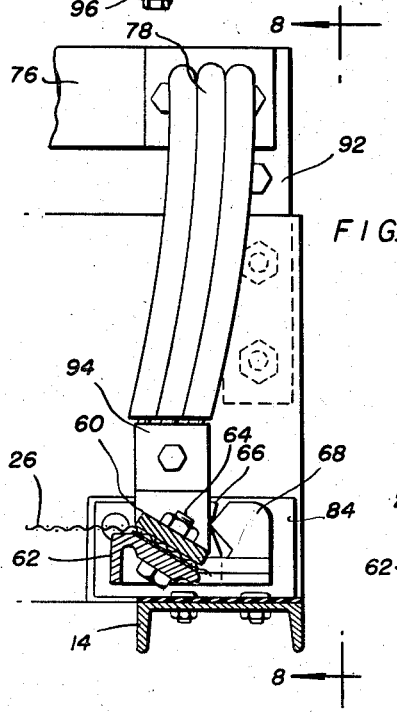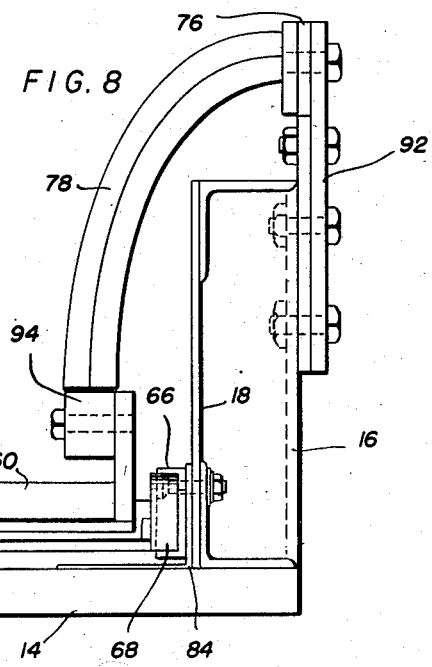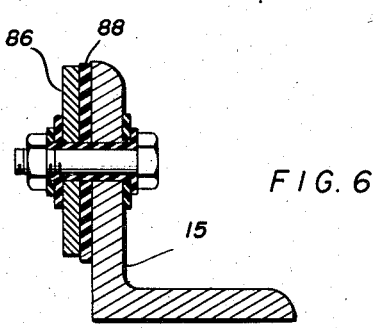

March 11, 1958  S. A. STONE ET AL  2,826,304
MATERIAL SEPARATING DEVICE
Filed Dec. 26, 1952  4 Sheets-Sheet 3

INVENTORS
SPENCER A. STONE
GERALD J. PIERRE
BY
ATTORNEYS

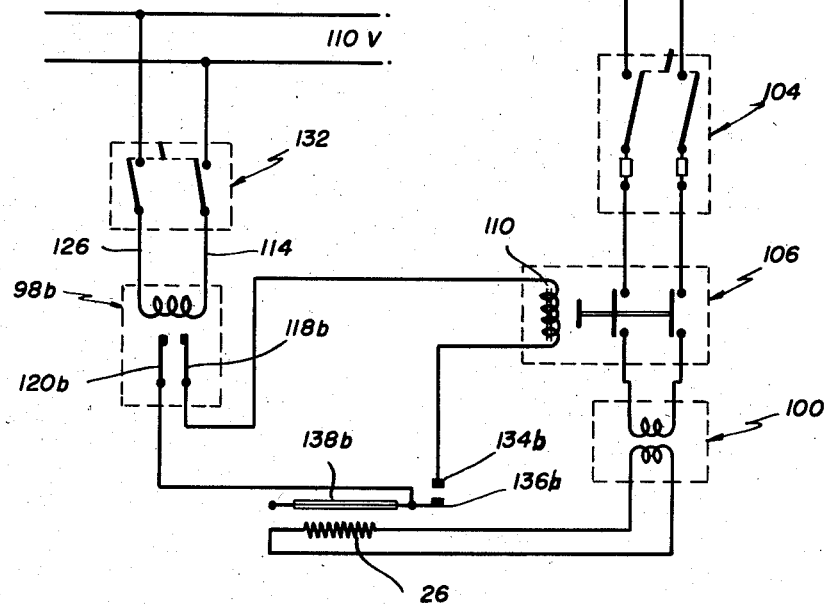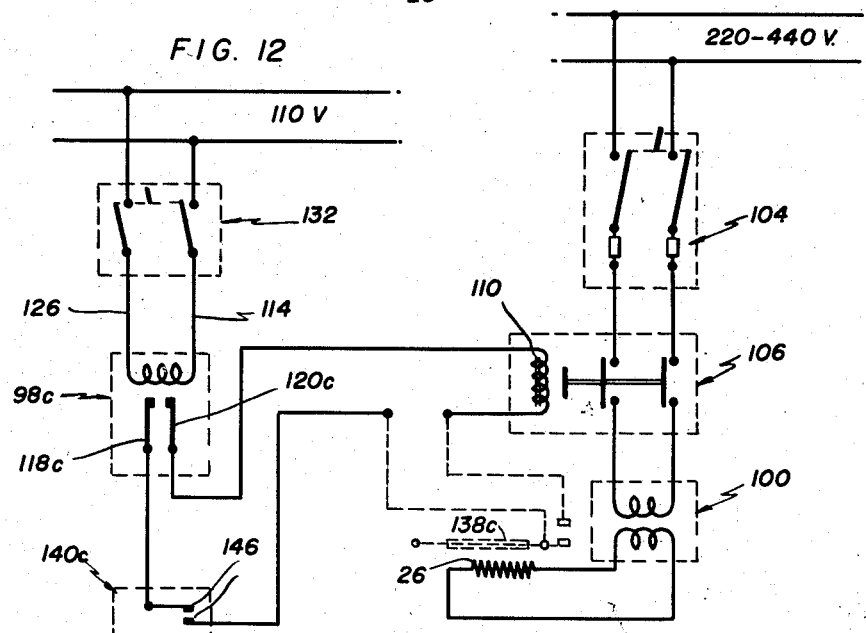

United States Patent Office 2,826,304
Patented Mar. 11, 1958

2,826,304

MATERIAL SEPARATING DEVICE

Spencer A. Stone, Fort Wayne, Ind., and Gerald J. Pierre, Detroit, Mich., assignors to The Deister Concentrator Company, Inc., a corporation of Indiana Application December 26, 1952, Serial No. 328,102

12 Claims. (Cl. 209—238)

The present invention relates to a separating device for use in producing desired quantities of granular materials having predetermined grain size.

In certain categories of separating equipment, a sifting or sizing screening medium of desired mesh size is used to sift or strain a quantity of material comprised of random sized particles. By using such a screening medium, grains too large to pass through are prevented from being included in the screened quantity thereby characterizing said quantity into a consistent particle mass having a maximum particle size.

In the screening operation, it is usually desirable to vibrate the screening medium to accelerate the process, and further it has been found advantageous to incline the screening medium and feed the raw material at the top of the screen and allow the oversize grains to roll off the bottom with the sifted material being collected therebeneath.

This described process has excellent success in separating thoroughly dry material; however, if the material contains moisture, it has a tendency to clog the screen meshes. The moisture is the adhesive which causes the material particles to adhere to the screening medium and to each other. Temperature affects this adhesive quality of the moisture.

In order to prevent the screen from glazing over as a consequence of such moisture, heat has been utilized during the screening operation to prevent the aforementioned adhering action. In some devices, the screening medium itself has been heated by the use of electrical energy, the screening medium serving as a resistance unit. However, considerable difficulty has been encountered in making electrical heating economical and controllable.

It is therefore, a principal object of this invention to overcome the foregoing mentioned difficulty and to provide an electrical heating device which may be operated economically, and concurrently provide fine control for applying only the heat needed at a given instant for efficient screening operation.

It is a further object to provide a control mechanism for controlling the maximum temperature of a screening medium and which is responsive to the actual temperature thereof.

Other objects will become apparent as the description proceeds.

To the accomplishment of the above and related objects, our invention may be embodied in the forms illustrated in the accompanying drawings, attention being called to the fact however, that the drawings are illustrative only, and that specific change may be made in the specific constructions illustrated and described, so long as the scope of the appended claims is not violated.

In the drawings,

Fig. 1 is a top plan view of an embodiment of this invention with the screen element being shown horizontally;

Fig. 2 is a side elevation of Fig. 1 in inclined operating position;

Fig. 3 is an end view of the same embodiment taken substantially on the section line 3—3 of Fig. 2;

Fig. 4 is a fragmental section taken substantially on section line 4—4 of Fig. 2;

Fig. 5 is a partial sectional view taken substantially on section line 5—5 of Fig. 4;

Fig. 6 is a cross-section of a frame piece taken substantially on section line 6—6 of Fig. 4;

Fig. 7 is a fragmental sectional elevation taken substantially on section line 7—7 of Fig. 1;

Fig. 8 is a partial front elevation taken substantially on section line 8—8 of Fig. 7; and Figs. 9, 10, 11 and 12 are circuit diagrams of different electrical control mechanisms used in conjunction with the physical embodiment of this invention as shown in the preceding figures.

Figure 9:
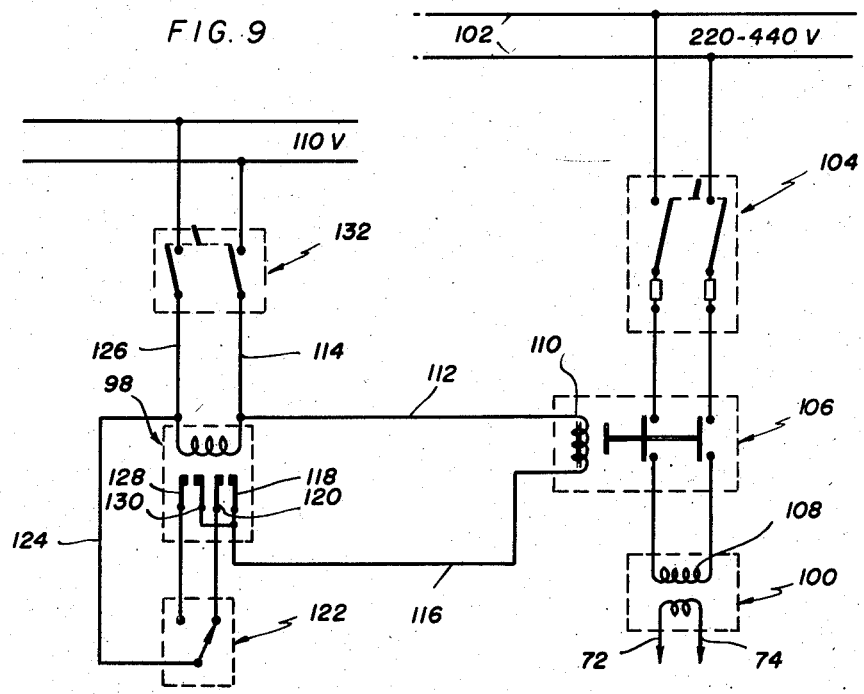

Referring to the drawings, and Figs. 1, 2 and 3 in particular a working embodiment of the present invention is shown as being comprised of a rectangular main frame generally indicated by the reference numeral 10. This frame 10 is comprised of two longitudinally extending side members 16 and 18 which are welded at their opposite ends to two transversely extending frame members 14 and 15. The two sides 16 and 18 are upright so as to provide, in effect, a chute having a discharge end 20 from which the feed material being separated may pass, and a receiving end 22 adapted to receive feed material for the separator. These sides 16 and 18, in addition to serving as sides for the chute, carry an upright auxiliary frame structure generally indicated by the reference numeral 24. The purpose of this auxiliary frame structure will become apparent from the following explanations.

A screen cloth or screening medium 26 is operatively suspended in tension between the end frame member 15 and lugs on the sides 16 and 18, respectively adjacent the end member 14 by means of fulcrum connections which will be described in more detail hereafter. In effect, the screen 26 serves as a floor for the chute and may be mounted in the frame 10 in any preferred manner. Preferably, a mechanism is provided for vibrating the screen at a predetermined rate during the screening operation, and in general this mechanism comprises a bracket 28 centrally secured to the screen 26 and having a connection by means of a rod 30 with a mechanical vibrator generally indicated by the reference numeral 32. This vibrator 32 may be of the multiple tooth cam type which is so connected to the rod 30 as to cause the latter to oscillate longitudinally according to a predetermined rate.

This vibrating mechanism is used for the purpose of producing vibrations throughout the medium 26 for facilitating the screening of material through the screen 26. This particular feature is well known to the art and needs no further explanation here.

As shown in Fig. 3, the vibrating mechanism 32 may be supported on the side pieces 16 and 18.

The mechanism 32 may be driven by any suitable prime mover such as the electric motor 38 which is carried on the table 40 extending from the frame side 16.

As shown in Fig. 2, the main frame 10 is supported on two base members 42 and 44, member 42 being positioned above the level of the member 44. The frame 10 may be adjusted to any desired degree of inclination by operation of the hand wheel 46 which may be locked in any given position by means of a pawl 48 which engages a rack 50 suitably secured to the upper end of the frame 10. Thus, with the frame inclined in the illustrated manner, material delivered to the upper end 22 will tend to slide down the screen 26, the granules smaller than the mesh of the screen tending to fall through the screen, while the material which is too large to pass through the screen tends to roll down the incline and out of the chute, discharge end 20.

The upper end of the screen 26 is suspended from the frame member 15 by means of two bracket-and-bolt connections 52 which receive on the outer ends thereof conventional nuts 54 which may be adjusted to produce the desired tension in the screen 26.

Preferably, the tension connections 52 are fastened to a pair of transversely extending clamping bars 56 which receive therebetween the upper transverse end portion of the screen 26, and the upper bar of which is preferably copper. Bolts 58 may be used to rigidly secure the end of the screen 26 between the clamps 56.

Similarly, the opposite end of the screen 26 is clamped between two bars 60 and 62 held together by means of bolts or the like 64, bar 60 preferably being constructed of copper. Two stationary V-blocks are fastened to the inner faces of the frame side members 16 and 18 at their lowest extremities, and provide indented line-edges which serve as fulcrums for engagement by the apex-edges of the two V-fulcrum members 68 which are secured to the opposite ends of the lower clamping bar 62. Thus, the screen 26 is effectively supported at its lower end by means of the edge engagement between the two blocks 66 and 68, and at its upper end by means of the two connecting assemblies 52 whereby the screen, when vibrated, will fulcrum about the lines of contact between the end supporting parts 52, 66, 68 and the main frame 10. Other schemes may be used for supporting the screen 26 in the frame 10 without departing from the scope of this invention.

Since, as explained previously it is desirable to heat the screen 26 in order to prevent glazing over, a novel method, as will be explained hereafter, is availed of for heating this screen electrically. In general, the electrical control elements of the heating circuitry are mounted on the frame 24 which is held upright by means of the brackets 34 attached to housing 32. The output of this circuitry which includes a power transformer enclosed in housing 70 is taken from the depending lugs 72 and 74 which extend from the bottom of the housing 70. Copper bus bars lead from these lugs 72 and 74 to the opposite ends of the screen 26, and as illustrated, a bar 76 leads from lug 74 to the lower screen clamping bars 60, 62 by means of a flexible conduit 78, and the bar 80 leads from the lug 72 to the upper clamping bars 56 by means of a flexible conduit 82. Since the currents utilized in heating the screens are relatively high, it is of course essential that the current-conducting bus bar and the associated flexible conduit sections be of sufficient size to safely and satisfactorily carry the currents. Of course, it is essential that the ends of the screen 26 be insulated from the frame 10 and this may be accomplished by any suitable means. In the present instance, the fixed V-blocks 66 are electrically separated from the sides of the frame by means of a strip of insulation 84, while the upper screen connecting assembly 52 is effectively insulated from the main frame by means of the assembly shown in Fig. 6 which is constituted by a fulcrum plate 86 spaced from the frame member by means of a strip of insulation 88. The nuts 54 on the connecting assemblies 52 are shown in Fig. 4 as engaging a knife-edge washer 90 which fulcrums on the plate 86.

It is preferable to rigidly support the bus bars 76 and 80 with respect to the associated mechanism, it being kept in mind, of course, that the bars must be separated electrically from the main frame 10. As shown in Fig. 8, an insulating bracket 92 is fastened to the side 16 of the frame 10, and serves to support the extreme lower end of the bus bar 76 and as a convenient connecting point for the flexible cable 78. The opposite end of the cable 78 is connected to a suitable lug 94 which is carried by the clamp bar 60.

The bus bar 80 is supported on the frame side 18 by means of an insulating bracket 96 mounted near the upper end of the side 18. The flexible conduit 82 is comprised of a plurality of spans of wire as seen in Fig. 4, and is connected at one end to the end of the bus bar 80 and at its other end to the upper section of the screen clamping bar 56.

With this arrangement, any voltage impressed across the two lugs 72 and 74 will cause a current to flow through the screen 26 from one end to the other, and since the screen is, in effect, an electrical resistor, by the use of sufficient amounts of current, the screen may be heated.

The circuit for controlling the flow of current through the screening medium 26, in order to operate efficiently, must be capable of supplying only the exact amount of current needed, at any particular time, as required by the quantity of material being separated on the screen, by the moisture content of this material, and the material temperature. For small amounts of material, it is obvious that only a small amount of current would be needed, and conversely, for large amounts of feed material having a high moisture content, it is of course necessary that the screen be capable of producing a considerable quantity of heat. The heating of the screening medium must also adapt to the temperature of the material, colder material requiring more heating current than warmer material.

In the past, a single transformer without control circuitry has been used, the transformer being provided with a series of voltage taps ranging from, for example, one and one-half volts to ten volts. Such transformers are expensive and will not necessarily provide the close adjustment needed for optimum economy of operation. It is possible that with such a transformer set on one tap, the power supplied may be insufficient to produce the necessary heat in the screen for preventing glazing over, whereas the next highest tap might deliver more current than would be required, and thereby result in a wastage of power.

The present invention uses a less expensive type of transformer having secondary voltage ranges somewhat higher than is normally needed to produce the maximum amount of heat required in the screening medium. Since this transformer is designed to have a capacity which is too large for continuous operation, it is necessary that it be controlled to supply just the required amount of power for economical heating. This control in this invention is provided by the use of a timer or master control 98 which may be of any suitable design so long as it operates to cause intermittent operation of the power transformer 100.

One suitable arrangement for the control circuit is shown in Fig. 9, and comprises power lines 102, which may carry either the standard 220 or 440 voltage values, or some other standard line voltage, connected by means of a double pole single throw switch 104 and a magnetic contactor 106 to the primary winding 108 of the transformer 100. The contactor 106 is essentially an electrically operated double pole single throw switch which may be operated by means of an electro-magnet represented by the coil 110. A line 112 leads from one side of this coil 110 to a line 114 and a suitable source of electric power, such as the conventional 110 volts. The other side of the coil 110 is connected by means of a wire 116 to a contact 118 of the timer 98. Another contact 120 engageable with the contact 118 is connected to one of the stator points of a single pole double throw switch 122. The rotor contact of the switch 122 is connected by means of wire 124 to a power line 126. Both power lines 114 and 126 lead into the timer 98 for operating the same. Another pair of timer contacts 128 and 130 are connected into the circuit much the same as the contacts 118 and 120, contact 130 being connected to contact 118 and contact 128 being connected to the remaining stator contact of the switch 122. With the switch in its illustrated position, the contacts 118 and 120 are in the circuit of the coil 110 for operating the contactor 106, whereas selection of the other contact of switch 122 will place the timer contacts 128 and 130 into the circuit for operating the contactor 106. The timer 98 is so arranged that the contacts 118, 120 and 128, 130 will open and close at different rates, so that selection of, for example, the contacts 118, 120 will result in the contactor 106 being energized for shorter periods of time than if the contactor 106 were operated by the timer contacts 128, 130. It should be obvious at this point, that the period of time the contactor 106 is energized will be dependent upon closure of the selected timer contacts, so that the magnetic contactor 106 may be operated in accordance with a desired plan by operation of the switch 122 to select the proper set of timer contacts.

Continuing with Fig. 9, closure of the switch 132 will cause energization of the timer 98, and with the switch 122 in its illustrated position, the timer contacts 118, 120 will be selected. These contacts will open and close at a rate determined by the timer 98 and will cause energization of the coil 110 and closure of the contactor 106 switch for connecting power to the transformer 100. A voltage is then impressed between the ends of the screen 26 to cause a current to flow therethrough. When the timer 98 opens the contacts 118, 120, the contactor coil 110 will be deenergized thereby opening the contactor 106 switch causing de-energization of the transformer 100. Depending upon the period of time the timer contacts are closed in relation to the time they are open, the screen 26 will generate an average temeprature proportional to such periods of closure and opening.

Now considering this particular embodiment of control circuit in connection with the construction described hereinbefore, any pulverized or granulated material delivered to the upper end 22 of the screen 26 will be sifted through the screen as it passes toward the discharge end 20. As explained previously, the vibrating action imparted to the screen 26 by the vibrating mechanism 32 will facilitate this sifting action. If large quantities of high moisture content material is delivered to the screen, it would of course be necessary to adjust timer 98 and set the switch 122 to the position in which the greatest amount of heat may be generated. As a corollary, if smaller quantities of material are being sifted, or if the material has a less degree of moisture content, the timer 98 and switch 122 should be set to the most economical setting in which a smaller amount of electrical power is delivered to the screen 26. By use of a timer 98 of infinitely variable percentage of "on" and "off" time, adjustment may be made to satisfy any heating requirement.

Hereafter, for the remaining embodiments of the control mechanism of this invention, like numerals will indicate like parts. Now with reference to Fig. 10, only one set of contacts 118a and 120a are used in the timer 98. However, these contacts are connected in series with a pair of contacts 134 and 136 which are moved into and out of engagement by means of a temperature responsive element or bi-metallic strip 138. This strip 138 is placed in the proximity of the screen 26 so as to be affected by the temperature of the screen and thereby introduce another feature of control. The contact 136 is connected by means of a wire 139 to one side of a double pole double throw switch 140 which is operative to close one circuit when the other is opened. As shown, when the timer 98 is operated by means of the power supplied thereto, and the switch 140 is moved to its illustrated position, power will be fed from the line 126 through the switch 140, the contacts 118a, 120a, to the contactor coil 110, for feeding the screen 26 in substantially the same intermittent manner as with the circuit of Fig. 9.

But, if switch 140 is thrown to its dotted line position, power will be fed from line 126 through switch 140, contact 136, contact 134, and to the contactor coil 110. Thus, so long as the contacts 134 and 136 are closed, power will be supplied to the screen 26; however, if the screen 26 should be heated to a value sufficient to cause the bi-metallic strip 138 to open the contacts 134, 136, the contactor coil 110 will be de-energized thereby cutting off the supply of power to the screen 26. The maximum allowable temperature of the screen 26 is then governed by the temperature responsive switch contacts 134, 136.

Figure 10:
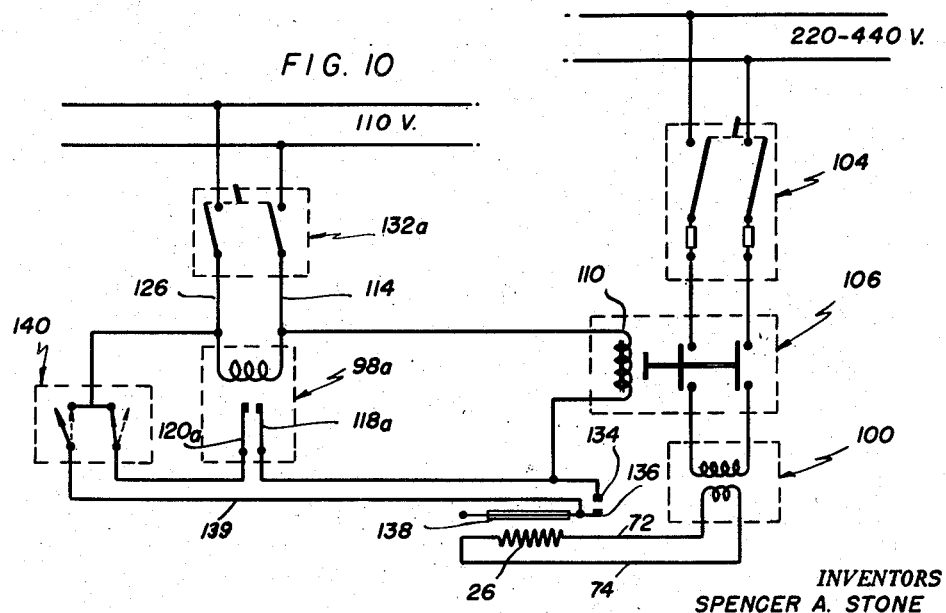

The embodiment shown in Fig. 11, differs from the embodiment of Fig. 10 in the respect that the contacts 118b and 120b are connected in series with the temperature operated contacts 134b, 136b. This arrangement provides for effective control of the supply of current pulses through the screen 26 at the rate governed by the timer 98. If the screen 26 gets too hot, the bi-metal 138b will open the contacts 134b, 136b and prevent further communication of power to the screen 26 until it has cooled sufficiently for the contacts 134b and 136b to close.

The arrangement shown in Fig. 12 is substantially identical to that of Fig. 9, with the exception that the limit switch 140c is placed in series with the timer contacts 118c, 120c and the contactor coil 110. This limit switch 140c may be seen in Fig. 2 as being operatively associated with the delivering chute 142 (shown dotted) which is suitably pivoted about a shaft 144 to open into the receiving end 22. This limit switch 140c is so adjusted that whenever any material is sliding down the chute 142, pressure is exerted on the switch closing its contacts 146, but if the flow of material should cease, the chute 142 is so balanced that it will tip upwardly to relieve the pressure on the switch 140c and allow the contacts 146 to be opened under, for example, spring pressure. When this occurs, the power supplied to the screen 26 is severed, thereby guarding against the screen 26 from being heated during periods when the separator is not being used. Of course, this limit switch may be incorporated in any of the other three embodiments as shown in Figs. 9, 10 and 11. Such a modification is indicated by the dashed line circuitry in Fig. 12 wherein 138c is the temperature responsive switch.

From the foregoing it will be apparent that the deficiencies of the prior art devices have been overcome and that efficient, reliable, and economical operation have been achieved. The transformer 100 when provided with multiple secondary windings will serve in conjunction with the foregoing described circuitry to provide a relatively wide range of heating control and make readily available the possibility of using a variety of screens having different resistance values.

The present invention has application in the field of separating solid or semi-solid foreign matter from preheated liquids without any loss of heat, since the temperature of the screen may be accurately controlled to prevent such loss as would occur from the use of a cold screen.

Specific terminology used in the foregoing description is not intended to limit the scope of the invention, but is used in the explanation of specific illustrated embodiments. Many patentably equivalent modifications will occur to persons skilled in the art, and such modifications as do not violate the scope of the appended claims are intended to be covered. While a screen 26 of reticulate construction or network has been illustrated and described, other screening means, such as a perforated sheet of suitable material, may be used without departing from the scope of this invention.

What is claimed is:

1. For a material separating device, a metallic sifting screen suspended in tension between two of its opposite ends, power operated means for vibrating said screen, an electrical control mechanism connected between said ends for controlling flow of current through said screen and comprising a transformer having secondary and primary windings, the secondary winding being connected across said two screen ends, a magnetically operated contactor connected across the primary winding and serving to selectively connect said primary winding to a source of power, an electrical timer mechanism having contacts which are alternately opened and closed to make and break an electrical circuit, said timer mechanism contacts being connected into the circuit of said magnetically operated contactor for operating the latter in accordance with the making and breaking of said contacts, a timing device included in said timer mechanism for causing said timer contacts to open and close in a predetermined manner, a switch connected in the circuit of said timer contacts and said magnetically operated contactor, and a thermo-responsive element positioned to be actuated by the heat of said screen and being operatively connected to said switch for opening and closing same in response to variations in the ambient temperature of said screen, said switch serving to control the operation of said contactor by said timer mechanism.

2. For a material separating device, a metallic sifting screen suspended in tension between two of its opposite ends, an electrical control mechanism connected between said ends for controlling flow of current through said screen and comprising a transformer having secondary and primary windings, the secondary winding being connected across said two screen ends, a magnetically operated contactor connected across the primary winding and serving to selectively connect said primary winding to a source of power, an electrical timer mechanism having contacts which are alternately opened and closed to make and break an electrical circuit, said timer mechanism contacts being connected into the circuit of said magnetically operated contactor for operating the latter in accordance with the making and breaking of said contacts, a timing device included in said timer mechanism for causing said timer contacts to open and close at a predetermined rate, a switch connected in the circuit of said timer contacts and said magnetically operated contactor and a thermo-responsive element positioned to be actuated by the heat of said screen and being operatively connected to said switch for opening and closing same in response to variations in the ambient temperature of said screen, said switch serving to control the operations of said contactor by said timer mechanism.

3. For a material separating device, a metallic sifting screen suspended between two of its opposite ends, an electrical control mechanism connected between said ends for controlling flow of current through said screen and comprising a transformer having secondary and primary windings, the secondary winding being connected across said two screen ends, a magnetically operated contactor connected across the primary winding and serving to selectively connect said primary winding to a source of power, an electrical timer mechanism having contacts which are alternately opened and closed to make and break an electrical circuit, said timer mechanism contacts being connected into the circuit of said magnetically operated contactor for operating the latter in accordance with the making and breaking of said contacts, a timing device included in said timer mechanism for causing said timer contacts to open and close at a predetermined rate, and a temperature responsive switching device mounted adjacent said screen, said switching device controlling the circuit which connects said timer mechanism to said contactor in response to ambient temperature changes of said screen.

4. For a material separating device, a metallic sifting screen suspended between two of its opposite ends, an electrical control mechanism connected between said ends for controlling flow of current through said screen and comprising a transformer having secondary and primary windings, the secondary winding being connected across said two screen ends, a magnetically operated contactor connected across the primary winding and serving to selectively connect said primary winding to a source of power, an electrical timer mechanism having contacts which are alternately opened and closed to make and break an electrical circuit, said timer mechanism contacts being connected into the circuit of said magnetically operated contactor for operating the latter in accordance with the making and breaking of said contacts, and a timing device included in said timer mechanism for causing said timer contacts to open and close at a predetermined rate.

5. For a material separating device, a metallic sifting screen suspended between two of its opposite ends, an electrical control mechanism connected between said ends for controlling flow of current through said screen and comprising a source of electric power connected across said two screen ends, a magnetically operated contactor connected to control actuation of said source, an electrical timer mechanism having contacts which are alternately opened and closed to make and break an electrical circuit, said timer mechanism contacts being connected into the circuit of said magnetically operated contactor for operating the latter in accordance with the making and breaking of said contacts, and a timing device included in said timer mechanism for causing said timer contacts to open and close at a predetermined rate.

6. A device for use in separating granulated materials comprising a sifting screen capable of being heated by the passage of an electric current therethrough, means secured to two opposite ends of said screen for suspending said screen in tension between spaced points, an electrical control device for applying current to said screen in a predetermined manner and comprising a source of electrical energy normally connected between said screen ends, a magnetic switch having an electro-magnetic coil and contacts which may be opened and closed by operation of said coil, timing means having contacts which are opened and closed automatically, said timing contacts being connected to said coil whereby said coil will be energized in accordance with the operation of said timing means, and a switch responsive to temperature changes interposed in the circuit between said timing contacts and said coil and operative to connect and disconnect said timing means to and from said coil respectively, said last-mentioned switch being operated by a temperature responsive element positioned to be actuated by ambient temperature changes of said screen.

7. A device for use in separating granulated materials comprising a sifting screen capable of being heated by the passage of an electrical current therethrough, an electrical control device for applying current to said screen in a predetermined manner and comprising a source of electrical energy normally connected between said screen ends, a magnetic switch having an electro-magnetic coil and contacts which may be opened and closed by operation of said coil, timing means having contacts which are opened and closed automatically, said timing contacts being connected to said coil whereby said coil will be energized in accordance with the operation of said timing means, and a switch responsive to temperature changes interposed in the circuit between said timing contacts and said coil and operative to connect and disconnect said timing means to and from said coil respectively, said last-mentioned switch being operated by a temperature responsive element positioned to be actuated by ambient temperature changes of said screen.

8. For a material separating device, a metallic sifting screen, two mounting bars clamped on opposite ends of said screen, an electrical control mechanism operatively connected to the screen ends for heating said screen and comprising a current-interrupting switch having contacts which alternately open and close at a predetermined rate, a source of electrical energy operatively connected to the ends of said screen for passing a current through said screen, said switch being interposed between said source and said screen for interrupting the aforementioned flow, a thermo-responsive switch device arranged in proximity to said screen and being responsive to temperature changes thereof, said thermo-responsive switch device controlling the application of said source to said screen and being operative to prevent such application when said screen is heated to a predetermined temperature.

9. For a material separating device, a sifting screen, an electrical control mechanism operatively connected to the screen ends for heating said screen and comprising a current-interrupting switch having contacts which alternately open and close at a predetermined rate, a source of electrical energy operatively connected to the ends of said screen for passing a current through said screen, said switch being interposed between said source and said screen for interrupting the aforementioned current flow, and a thermo-responsive switch device arranged in proximity to said screen and being responsive to temperature changes thereof, said thermo-responsive switch device controlling the application of said source to said screen and being operative to prevent such application when said screen is heated to a predetermined temperature.

10. For a material separating device, a metallic sifting screen, two mounting bars clamped on opposite ends of said screen, an electrical control mechanism operatively connected to the screen ends for heating said screen and comprising a current-interrupting switch having contacts which alternately open and close at a predetermined rate, and a source of electrical energy operatively connected to the ends of said screen for passing a current through said screen, said switch being interposed between said source and said screen for interrupting the aforementioned current flow.

11. For use in a material separating mechanism, an electrically heated screen, means conductively coupled to said screen for passing a current therethrough, a feed chute positioned to deliver material to said screen and a limit switch operatively associated with said chute and operable thereby, said switch dominating said means and operative by said chute during the period of material delivery to energize said means and further operative by said chute to de-energize said means during the period no material is being fed to said screen.

12. The mechanism as claimed in claim 11 having a temperature sensitive switch connected in the circuit of said limit switch in such a manner that said means is energized only when both switches are operated in a predetermined manner, said temperature sensitive switch being responsive to temperature variations of said screen to interrupt the passage of current through said screen.

References Cited in the file of this patent

UNITED STATES PATENTS

| | | |
|---|---|---|
| 1,710,795 | Arms | Apr. 30, 1929 |
| 2,014,291 | Reed | Sept. 10, 1935 |
| 2,064,654 | Gannon | Dec. 15, 1936 |
| 2,118,642 | Flynn et al. | May 24, 1938 |
| 2,217,568 | Shirley | Oct. 8, 1940 |
| 2,363,413 | Guenzel et al. | Nov. 21, 1944 |
| 2,533,409 | Tice | Dec. 12, 1950 |
| 2,645,032 | Hammell | July 14, 1953 |

FOREIGN PATENTS

| | | |
|---|---|---|
| 457,062 | Italy | May 4, 1950 |
| 665,313 | Great Britain | Jan. 23, 1952 |
| 682,028 | Great Britain | Nov. 5, 1952 |

OTHER REFERENCES

Hively, "Electrically Heated Clay Screens," Electrical World, January 1951, pages 174 and 178.